US006917598B1

(12) United States Patent
Emeott et al.

(10) Patent No.: US 6,917,598 B1
(45) Date of Patent: Jul. 12, 2005

(54) UNSCHEDULED POWER SAVE DELIVERY METHOD IN A WIRELESS LOCAL AREA NETWORK FOR REAL TIME COMMUNICATION

(75) Inventors: Stephen P. Emeott, Rolling Meadows, IL (US); Ye Chen, Schaumburg, IL (US); Floyd D. Simpson, Lake Worth, FL (US); Huai Y. Wang, Greenacres, FL (US); Timothy J. Wilson, Rolling Meadows, IL (US); Nattavut Smavatkul, Elkgrove Vllg., IL (US)

(73) Assignee: Motorola, Inc., Schaumburg, IL (US)

( * ) Notice: Subject to any disclaimer, the term of this patent is extended or adjusted under 35 U.S.C. 154(b) by 25 days.

(21) Appl. No.: 10/741,651

(22) Filed: Dec. 19, 2003

(51) Int. Cl.[7] .............................................. G08C 17/00
(52) U.S. Cl. ...................................... 370/311; 370/338
(58) Field of Search ........................ 370/311, 318, 338, 370/346, 348, 443, 444, 445, 447, 448, 449, 370/455, 461, 496

(56) References Cited

U.S. PATENT DOCUMENTS

| 2002/0132603 | A1 * | 9/2002 | Lindskog et al. ........... 370/311 |
| 2003/0093526 | A1 * | 5/2003 | Nandagopalan et al. .... 709/225 |
| 2004/0131019 | A1 * | 7/2004 | Kandala ...................... 370/311 |
| 2004/0190467 | A1 * | 9/2004 | Liu et al. ..................... 370/311 |
| 2004/0253996 | A1 * | 12/2004 | Chen et al. ................. 370/311 |
| 2004/0264396 | A1 * | 12/2004 | Ginzburg et al. ........... 370/311 |
| 2005/0009578 | A1 * | 1/2005 | Liu ............................. 455/574 |

\* cited by examiner

Primary Examiner—Chi Pham
Assistant Examiner—Anh-Vu H Ly
(74) Attorney, Agent, or Firm—Scott M. Garrett

(57) ABSTRACT

A mobile station (106) establishes a real time communication link via an access point (102) for carrying voice or other time-sensitive data. A WLAN subsystem (204) of the mobile station is normally kept in a low power state. Upon initiating a communication link the mobile station signals to the access point that unscheduled power save delivery mode will be used (614), and the access point reserves resources to assure the necessary quality of service. The mobile station initiates a frame transaction by first powering up the WLAN subsystem (712), acquiring the WLAN channel (407), and transmitting a polling frame. Upon successful receipt of the polling frame the access point prepares to reply with an aggregate response. The aggregate response commences by transmitting all data in an aggregate buffer, including both reserved and unreserved data buffers. Upon successful receipt of the aggregate response, the mobile station places the WLAN subsystem back into a low power state.

24 Claims, 6 Drawing Sheets

UNSCHEDULED POWER SAVE DELIVERY METHOD IN A WIRELESS LOCAL AREA NETWORK FOR REAL TIME COMMUNICATION

TECHNICAL FIELD

This invention relates in general to wireless local area networks, and more particularly to power save methods for reducing power consumption at a mobile station while engaged in a time sensitive communication activity.

BACKGROUND OF THE INVENTION

Wireless LAN (WLAN) systems providing broadband wireless access have experienced a spectacular rise in popularity in recent years. While the principal application of these systems has been in providing network connectivity to portable and mobile devices running data applications such as, for example, email and web browsing, there has been a tremendous and growing interest in supporting isochronous services such as telephony service and streaming video.

One of the key issues facing wireless system designers when considering voice and other time-sensitive services over a WLAN connection, such as one described by the IEEE 802.11 specification, is the power consumption of handheld devices. For example, in order to deliver competitive talk time and standby time, as compared to digital cordless or cellular devices, power conservation during voice calls become necessary. Several organizations have proposed power-efficient operation via transmit power control and physical layer rate adaptation for systems that rely on a centrally controlled contention-free channel access scheme. However, such approaches can be complex to implement and may not provide the power savings required to justify the complexity.

The 802.11 standard defines procedures which can be used to implement power management in a handheld device during periods of inactivity. In particular, three distinct building blocks are provided to support power savings: a Wakeup Procedure, a Sleep Procedure, and a Power-save Poll (PS-Poll) Procedure. A mobile client voice station (mobile station) can combine these building blocks in various manners to support power management for different applications.

Wakeup Procedure: There are generally two reasons for the mobile station to wake up, namely to transmit pending data or to retrieve buffered data from the fixed station serving the mobile station, known as an access point. Waking up to transmit data is a straightforward operation, driven by the mobile station. The decision to wake up and receive data is also made by the mobile station after monitoring its pending data bit in a periodic beacon frame transmitted by its access point. Once the mobile station decides to transition from sleep mode to active mode, it notifies the access point by sending an uplink frame with the power-save (PS) bit set to active. Following such transmission, the mobile station remains active so the access point can send any buffered downlink frames afterward.

Sleep Procedure: Similar to the wakeup procedure, a mobile station in the active mode needs to complete a successful mobile station-initiated frame exchange sequence with PS bit set to sleep to transition into the sleep mode. Following this frame exchange sequence, the access point buffers all the downlink frames to this mobile station.

PS-Poll Procedure: Instead of waiting for the access point to transmit the buffered downlink frames, a power-save mobile station can solicit an immediate delivery from its access point by using a PS-Poll frame. Upon receiving this PS-Poll, the access point can immediately send one buffered downlink frame (immediate data response) or simply send an acknowledgement message and response with a data frame later (delayed data response). For the immediate data response case, a mobile station can stay in sleep state after finishing this frame exchange since there is no need for the mobile station to transition to active state given that the access point can only send a buffered downlink frame after receiving a PS-poll from the mobile station. On the other hand, for the delayed data response case, the mobile station has to transition to the active state until receiving a downlink frame from the access point.

The architecture of a simple enterprise WLAN system is depicted in FIG. 1. Referring now to FIG. 1, there is shown a block system diagram overview 100 of a typical enterprise WLAN system. It includes an infrastructure access network 101, consisting of an Access Point 102 and mobile stations such as a data stations 104 and a voice station 106. The mobile stations are connected to the access point via a WLAN radio link 108. The access point is wired to a distribution network, including voice and data gateways 110, 112 respectively, through a switch 114. The voice station runs a Voice-over-IP (VoIP) application, which establishes a peer-to-peer connection with the voice gateway, representing the other end of the voice call, and which routes voice data to a voice network 116. Data stations may connect to the data gateway via the access network and connect to, for example, a wide area network 118. The impact of data traffic on voice quality should be considered. It is assumed that both the voice and data stations employ a prioritized contention-based quality of service mechanism.

VoIP traffic characteristics make voice over WLAN applications uniquely suited for power save operation. In particular, VoIP applications periodically generate voice frames, where the inter-arrival time between frames depends upon the voice coder chosen for an application. The process of encapsulating voice frames into IP packets is commonly referred to as packetization, which is often assumed to occur once every 20 millisecond. A typical VoIP conversation involves a bi-directional constant bit rate flow of VoIP frames, including an uplink flow from the handset to a voice gateway and a downlink flow in the reverse direction.

Since the station generally knows in advance the frame arrival rate, delay, and bandwidth requirements of its voice application, it can reserve resources and set up power management for its voice flows in agreement with the access point. A mobile station may forgo power save mode, and remain in active mode, always ready for the downlink voice transmission. In this case, the access point may transmit downlink voice frames as they arrive. However, if power save is desired, the mobile station may employ the power save building blocks described previously to wake up, exchange the VoIP frame with its access point, and go back to sleep.

In a shared-medium network, such as the access network shown in FIG. 1, it is important to prioritize VoIP traffic over traffic requiring only best-effort delivery, such as the traffic generated by application that can adapt to the amount of bandwidth available in the network and do not request or require a minimum throughput or delay. Prioritization allows the system to minimize the delay experienced by delay-sensitive traffic. A contention-based channel access scheme offering prioritized access named Enhanced Distributed Channel Access (EDCA) has been specified in the IEEE 802.11e draft, and is suitable for VoIP applications. It is based upon the Carrier Sensing Multiple Access with Collision Avoidance (CSMA/CA) mechanism defined in 802.11. Stations with voice frames to send must first sense the channel for activity, before transmitting. If the channel has been idle for at least a specified period of time, called an arbitration inter-frame space (AIFS), the mobile station can immediately begin its transmission. Otherwise, the mobile station backs off and waits for the channel to be idle for a random amount of time, which is equal to an AIFS period plus a uniformly distributed value between zero and a contention window (CW) time period value. The CW is further bounded by Minimum contention window (CWmin) and Maximum contention window (CWmax). EDCA provides prioritized access control by adjusting contention parameters: AIFS, CWmin, and CWmax. By selecting different values of AIFS, CWmin, and CWmax for different access categories, the priority to access the medium can be regulated and differentiated. In general, small AIFS, CWmin, and CWmax values result in higher access priority.

It is possible for a mobile station to use information such as the inter-arrival time of downlink voice frames, along with a power-save mechanism, to put itself to sleep between two consecutive voice frames. Presently there are power save procedures described in various papers and WLAN related specifications.

The first prior art power management mechanism utilizes a bit in the packet header. The bit is designated as a power management (PM) bit to signal the change of the power state of the mobile station to the access point. First, a mobile station transitions from sleep mode to active mode upon having an uplink data frame to transmit by setting the PS bit to active in an uplink voice frame to notify the change of its power state. Knowing that there will be one corresponding downlink frame buffered at the access point, because uplink and downlink vocoder share the same voice frame duration, the mobile station stays in active mode for the downlink transmission. After receiving the uplink transmission, the access point then sends buffered downlink frames to the mobile station. In the last downlink frame, the access point sets the "more data" bit to FALSE to communicate the end of the downlink transmission. Finally, the mobile station needs to complete a successful station-initiated frame exchange sequence with PS bit set to sleep to transition into the sleep mode. (e.g. an uplink frame, or a Null frame if there is no uplink data frame to transmit, with the PS bit set to sleep). In the following context, the PS-bit based mechanism is referred to as LGCY6 in the art.

A second power management mechanism uses a PS-Poll frame to solicit downlink frames. Instead of waiting indefinitely for the access point to deliver downlink transmission, the PS-Poll based mechanism utilizes the PS-Poll frame to retrieve the buffered downlink frame from the access point. First, a mobile station transitions to active mode upon having an uplink data frame to transmit. The mobile station then sends out the uplink transmission. Similar to the PS-bit based mechanism, the access point sets the more data field to indicate the presence of any buffered downlink transmission. If the more data bit is TRUE, the mobile station will continue to send a PS-Poll frame to retrieve the buffered downlink frame. Unlike the PS-bit based mechanism, a mobile station can stay in the sleep state since the access point responds to the PS-Poll with an immediate data frame. In the following context, the PS-Poll based mechanism is referred to as LGCY5 in the art.

There are a couple of issues in supporting power-efficient VoIP operation using the current WLAN power save mechanisms. First, the PS-bit based mechanism is somewhat inefficient because, for example, the 802.11 standard currently only offers one way for the mobile station to transition to sleep mode, which is by initiating a frame exchange sequence with PS bit set to sleep. As a result, an extra mobile station initiated frame exchange is needed per bi-directional voice transfer in order for the mobile station to signal power state transition. Since the payload of a voice frame is small (e.g. 20 bytes for voice application with 20 ms framing and 8 Kbps vocoder), the overhead incurred by the extra frame exchange could be as high as one third of the traffic between the mobile station and access point. The significant overhead results in the inefficiency on both power consumption and system capacity.

A second issue is related to quality of service. Under the PS-Poll based mechanism, since a mobile station is not aware of the priority of the buffered downlink frame, the PS-Poll frame is sent as a the best effort access attempt, which is a data traffic mode instead of a voice traffic mode. As a result, the downlink voice transmissions essentially use the best-effort priority instead of the higher voice priority. When a system is loaded with both data traffic using best-effort priority with voice traffic, and a mobile station retrieves downlink voice traffic using a power save poll frame transmitted at the same priority as data traffic, the system will be unable to protect the voice traffic from the delays associated with a congested best-effort delivery system. Legacy power save methods may also require an uplink or poll frame to retrieve each buffered frame for the down link, or require immediate response from the access point for a given uplink frame. One method of providing a particular quality of service is to use scheduled service periods at regular intervals for a given mobile station. This scheduled mode of power save deliver is referred to as automatic power save delivery (APSD). The mobile station wakes up at regular intervals and listens to the channel. The access point is synchronized to the service period, and transmits data at the scheduled time. Thus, the mobile station can put the WLAN subsystem to sleep during the periods between scheduled service intervals. However, this method limits the flexibility of the WLAN channel since there is no ability for the mobile station to deviate from the schedule. Therefore, given these shortcomings of the prior art, there is a need for a reliable power management protocol in a WLAN system that permits mobile station with active voice sessions to efficiently enter and exit power save mode without excessive overhead and maintain quality of service in the presence of lower priority traffic.

DETAILED DESCRIPTION OF A PREFERRED EMBODIMENT

Figure 1:
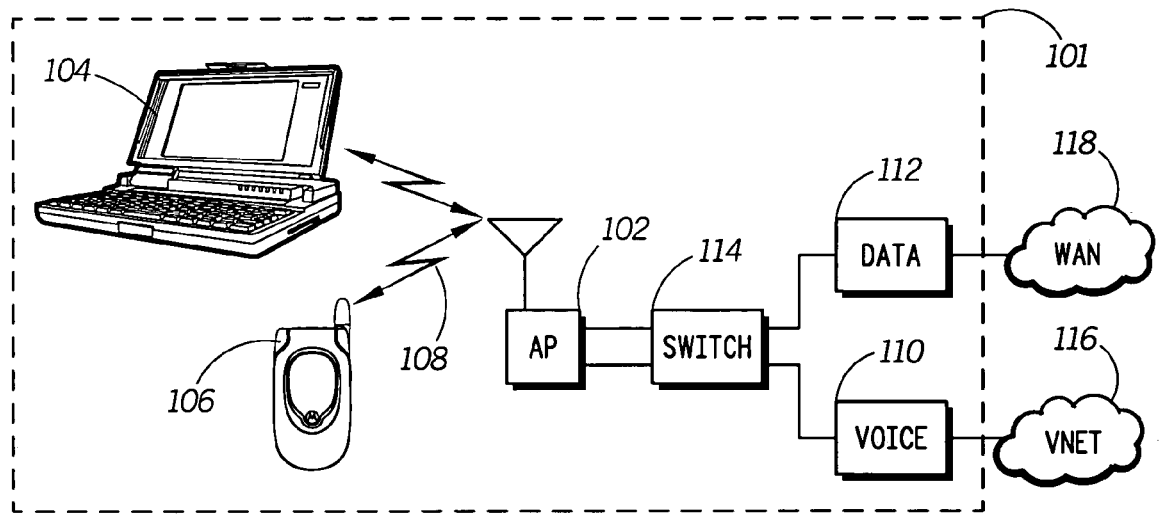
FIG. 1 shows a block system diagram overview of a typical enterprise WLAN system that may support both prior art methods of WLAN transactions as well as those in accordance with the present invention.

While the specification concludes with claims defining the features of the invention that are regarded as novel, it is believed that the invention will be better understood from a consideration of the following description in conjunction with the drawing figures, in which like reference numerals are carried forward.

The invention solves the problems associated with the prior art by providing an unscheduled power save delivery (UPSD) mode of operation in a wireless local area network (WLAN) system which permits a mobile station in power save mode to retrieve frames from an access point without requiring the access point to respond immediately to a polling frame, without requiring the mobile station to poll the access point for each downlink frame, and without requiring the mobile station to transmit a frame to inform the access point of a transition to a low power mode. Furthermore, it allows the mobile station to receive an aggregate delivery of data, which includes both data for reserved streams as well as "best-effort" data, or unreserved data. When the mobile station uses the present UPSD power save mode, it first establishes a resource reservation with an access point signaling its intention to use the UPSD mode to retrieve data from the access point during power save operation. The mobile station indicates to the access point the intent to use the UPSD mode by information in the traffic specification admissions control frame sent to the access point from the mobile station. During call set-up negotiation the access point reserves sufficient resources to ensure a voice quality session, and identifies the stream with a unique traffic stream identifier which is later used by the mobile station to trigger a state transition into unscheduled power save delivery mode. Alternatively, the mobile station and access point may negotiate a resource reservation for an entire access category, representing an aggregate traffic stream comprised of one or more individual traffic streams. By access category it is meant the priority of the traffic associated with the reserved stream compared to other reserved stream access categories. Priority is determined in part by the minimum backoff period to be used in contention for the access category. Whether the admissions control module makes a decision based on traffic streams or access categories, reserving the resources is said to be admitting the traffic stream, and all data associated with the reserved traffic stream is identified as such. Once the intent to use the present power save mode is communicated to the access point, the mobile station commences putting the WLAN subsystem circuitry into a low power mode, such as by turning off the WLAN chip set and associated circuits. In the preferred embodiment the mobile station operates the WLAN subsystem according to a service interval time period while engaged in a WLAN voice session. The service interval is defined as the real time duration of the data contained in a frame of data. Typically, for example, the service interval for voice traffic is on the order of 20 milliseconds. In practice, however, the actual time between service periods varies slightly from defined service interval due to factors such as the inter-arrival time between frames and other small, fluctuating delays inherent in large networks. The mobile station initiates a frame exchange service period with the access point by waking up the WLAN subsystem. That is, the WLAN subsystem transitions from low power mode to fully active mode, referring here to the actual power level state of the WLAN subsystem, and not the state of power save signaling bits in the frames sent to the access point. If the mobile station voice processor has produced a data packet to be transmitted, the WLAN subsystem begins acquiring the WLAN channel to transmit the data to the access point with a polling frame, identifying the polling frame as belonging to the reserved traffic stream, or identifying it as one of the reserved traffic streams if more than one has been admitted for the mobile station by the access point. If there is no data available, the WLAN subsystem preferably waits until the expiration of a polling window timer, at which time if no data has yet to be delivered by the voice processor, the WLAN subsystem acquires the WLAN channel and transmits a null frame as the polling frame. In the polling frame, according to an alternative embodiment of the invention, the mobile station may direct the access point to transmit an aggregate response, meaning the access point will transmit not just data for the reserved traffic stream, but any other data the access point may have buffered for the mobile station as well. In the preferred mode the access point will transmit an acknowledgement in response to receiving the polling frame. Thereafter, the access point transmits an aggregate response frame to the mobile station. If the access point has data buffered in a buffer reserved for the reserved traffic stream, the response frame will include that data. If the access point has other data, such as for unreserved flows, the access point may transmit that data as well in aggregation with the reserved flow data. If the access point has no reserved or unreserved data, a null frame is transmitted to the mobile station, or alternatively the access point's acknowledgement of the polling frame may indicate there is no data in the access point's aggregate buffer for the mobile station. If the access point has more than one frame of data, then the access point indicates such in the header information of the response frame. Alternatively, the access point may send data of any type it has buffered for the mobile station, regardless of admission status of the data. The mobile station maintains the WLAN subsystem in active mode until the buffered data is received from the access point. In the preferred mode the mobile station acknowledges each response frame by transmitting an acknowledgement. Once all buffered data is received from the access point for the present service period, the mobile station puts the WLAN subsystem back into low power mode.

Figure 2:
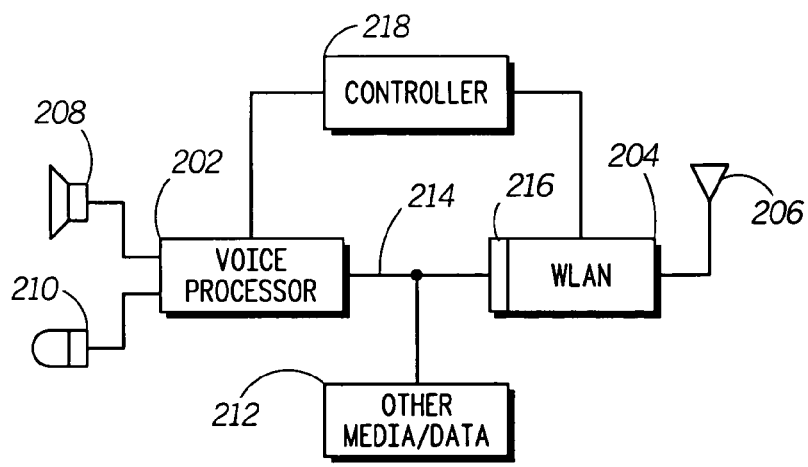
FIG. 2 shows a schematic block diagram of a mobile station for use in a WLAN system, in accordance with the invention.

Referring now to FIG. 2, there is shown a schematic block diagram 200 of a mobile station for use in a WLAN system, in accordance with the invention. The mobile station comprises a voice processor 202 for processing voice signals, including transforming signals between digital and analog form. The voice processor is operably coupled to a WLAN subsystem 204. The WLAN subsystem contains data buffers and radio hardware to send and receive information over a wireless radio frequency link via an antenna 206. The voice processor converts digital voice and audio data received from the WLAN subsystem to analog form and plays it over a transducer, such as a speaker 208. The voice processor also receives analog voice and audio signals from a microphone 210, and converts them to digital signals, which are sent to the WLAN subsystem. Preferably the voice processor also performs voice encoding and decoding, by using, for example, vector sum excited linear predictive coding techniques, as is known in the art. The use of voice encoding allows for compression of the voice data. In addition to voice processing, the mobile station may have other media processors, abstracted as box 212, which may included regular data applications such as email, for example. These other data processors are likewise operably coupled to the WLAN subsystem via bus 214, for example. As data arrives at the WLAN subsystem, it gets buffered in a WLAN buffer 216 and subsequently packetized for transport over IP networks. Each processor sending data to the WLAN subsystem indicates the type of data, and formats the data for transmission, indicating the type of data in the frame. All data processors and the WLAN subsystem are controlled by a controller 218. The controller dictates the power save operation of the WLAN subsystem, setting it into lower power states when appropriate and powering it up when it is time to transmit or receive data.

Figure 3:
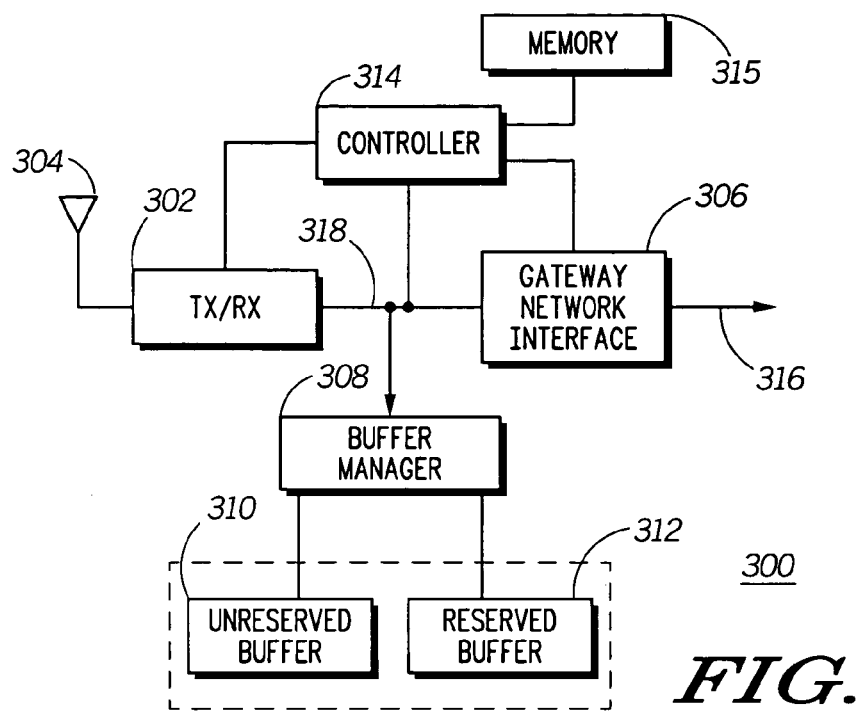
FIG. 3 shows a schematic block diagram of an access point for use in a WLAN system, in accordance with the invention.

Referring now to FIG. 3, there is shown a schematic block diagram 300 of an access point for use in a WLAN system, in accordance with the invention. A WLAN transceiver 302 performs the radio frequency operations necessary for communicating with mobile stations in the vicinity of the access point via an antenna 304. The access point is connected to networks via gateway network interface 306, typically via a hard line 316, such as a coaxial cable, for example. Data received at the access point from mobile stations is immediately forwarded to the gateway for routing to the appropriate network entity. Data received at the access point from the network that is bound for a mobile station may be treated according to one of at least three classifications. First, the mobile station may be in active mode, in which case the data will be buffered only until it can be transmitted. In such a case the intent is to not delay transmission to the mobile station any longer than necessary, and data for a mobile station of this classification is transmitted typically transmitted using a priority-based queuing discipline. A second category of mobile station power save state is a mobile station in an unreserved or legacy power save mode. For this second classification, a buffer manager 308 buffers the data in an unreserved data buffer 310 upon receiving it from the gateway 306 via a bus 318. Unreserved data is data that does not belong to a reserved traffic stream. When the particular mobile station for which the unreserved data is buffered transmits to the access point either an unreserved data power save poll frame or a frame that transitions the mobile station to the active state, the access point will respond by transmitting the unreserved data to the polling station from the unreserved data buffer. The manner of delivery may be controlled by the mobile station, where the unreserved data is only delivered in response to a specific polling or trigger frame, or it may be delivered at regularly scheduled and agreed upon time intervals. A third power save classification the access point may receive data for is reserved data bound for a mobile station using the present UPSD power save mode, in accordance with the invention. Reserved data is data that belongs to a reserved traffic stream. For this reserved flow data, the buffer manager 308 buffers the data in a UPSD buffer, such as reserved buffer 312. By reserved buffer it is meant that the buffer is for buffering data belonging to a reserved traffic stream. Although illustrated here as two separate physical buffers, one skilled in the art will understand that a variety of buffering techniques may be used to keep reserved and unreserved data separate, without necessarily requiring separate physical buffers. Furthermore, given that the access point will respond to the polling frame with an aggregate response, the unreserved data buffer and UPSD buffer may be treated as an aggregate buffer 309. It is the intent of the invention that when the access point is polled by the mobile station, it empties the aggregate buffer by transmitting all aggregate buffered data to the mobile station.

Since the data associated with the reserved traffic stream is time sensitive, the access point preferably maintains an aging policy. In the preferred embodiment of the invention the aging policy permits only two frames of data to be buffered for a reserved traffic stream. If there are two frames presently buffered, and a third frame arrives, then the oldest frame is discarded, and the new frame is buffered. Supervising the operation of the buffer manager 308, gateway 306, and transceiver 302 is a controller 314. The controller also administers resource management and controls resources so that quality of service may be assured as needed for reserved traffic streams. The controller is operably coupled to a memory 315, which it uses to track the status of call, mobile station power save states, and other parameters.

Figure 4:
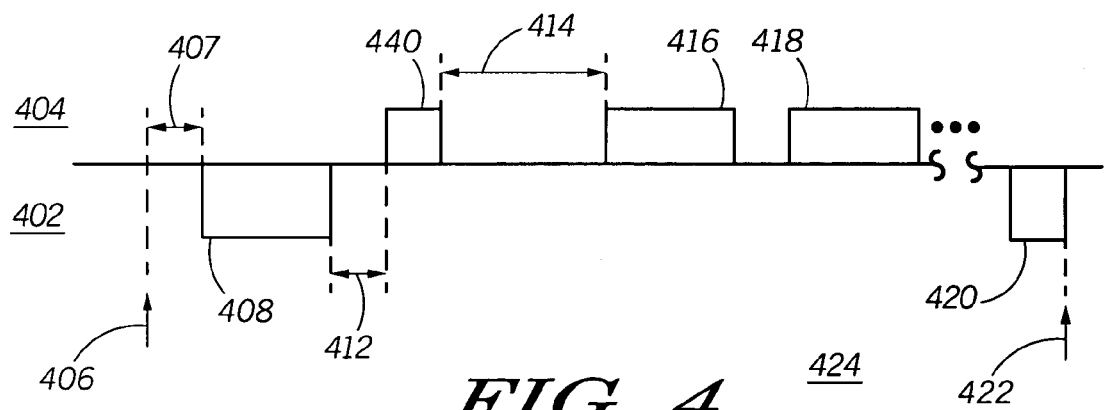
FIG. 4 show a flow diagram illustrating an overview of the traffic flow between a mobile station and an access point in a WLAN system for supporting voice quality communication, in accordance with the invention.

Referring now to FIG. 4, there is shown a flow diagram 400 illustrating an overview of the traffic flow between a mobile station and an access point in a WLAN system for supporting voice-quality communication using the present UPSD mode of the invention. The traffic flow includes a reserved traffic stream, meaning that the mobile station and access point have negotiated a priority and medium time for the reserved traffic stream to ensure a desired quality of communication, where the medium time indicates the amount of time per negotiated service interval the access point will apportion to the traffic stream or access category. With voice traffic, since it occurs in real time, it is desirable to establish a reserved traffic stream for the communication. The system carrying out the flow shown here in FIG. 4 may be performed by a system using configurations and system components similar to those shown in FIGS. 1–3 with control software designed in accordance with the teachings herein.

The mobile station transmissions appear on the bottom flow line 402, while the access point transmissions appear on the top flow line 404. As mentioned, prior to the transaction illustrated here, the mobile station and access point will have established a reserved traffic stream, meaning the access point has reserved certain resources to maintain voice quality of the traffic stream. That is, the access point will be able to service the flow in a timely manner so that the real time effect of the flow is maintained. To prevent an overloaded scenario in a WLAN voice system, where an excessive number of high priority users might make it difficult for a system to satisfy quality of service requirements, admission control should be required for certain services, such as real time voice and video streaming. For example, in an infrastructure based voice WLAN system, a mobile station (e.g. voice user) should set up a bi-directional traffic flow for voice using a known traffic specification, and the access point should acknowledge the admission of the flow to the mobile station. By admitting the flow, it is meant that the data flow will be a reserved traffic stream having a unique traffic stream identifier. The reserved traffic stream will have a priority classification and will be apportioned a minimum amount of channel access time. During the connection setup period, the UPSD power save mechanism can be established by mobile station implicitly by the use of a traffic specification reservation. In frames containing data for the reserved traffic stream, the unique traffic stream identifier (TSID) will be included. The mobile station can choose no power save operation, legacy power save operation, or the present UPSD power save operation. After the traffic flow is admitted by the access point, the mobile station puts the WLAN subsystem in a low power state.

After the WLAN subsystem is placed in low power mode, the mobile station preferably maintains a service interval timer to maintain real time operation of the flow. Preferably at the beginning of a service interval, the mobile station activates the WLAN subsystem, such as at time 406. After which, during the time period 407, the mobile station begins contending for the WLAN channel. The mobile station initiates the exchange by transmitting a polling frame 408. The polling frame may be a voice frame, which in the preferred embodiment contains a unique traffic stream identifier, and a frame of voice data if the user of the mobile station is presently speaking, or if there is no voice data to transmit presently, the polling frame will be a null frame. The polling frame will identify the reserved traffic stream and indicate UPSD power save mode. The polling frame may also include signaling to indicate a desire for the access point to use the aggregate response method so that both reserved and unreserved data may be received. Alternatively, the aggregate response may be the default response mode.

In the preferred embodiment, after the access point receives the polling frame, it transmits an acknowledgement 410 within a short interframe space time period 412, which is a scheduled event, in accordance with the IEEE 802.11 specification. In response to receiving the polling frame, the access point transmits at least one response frame 416 to the mobile station, assuming the access point has aggregate buffered data for the mobile station. Assuming there is both unreserved data and reserved data in the aggregate buffer, at least a second response frame 418 will be transmitted. The access point will continue to transmit response frames until the aggregate buffer is empty, or, alternatively, upon the expiration of a service period time. Each response frame includes an end of uplink service period (EUSP) bit, such as a MORE_DATA bit to indicate whether there is more data coming from the access point, or whether the present response frame is the last response frame for the service period. It is contemplated that the access point may not completely empty the aggregate buffer of unreserved data if the access point is presently servicing a high number of reserved traffic streams for other mobile station, and the delivering the unreserved data may interfere with the delivery of reserved traffic.

The time period between receiving the polling frame and transmitting the response frame can vary as the access point may have to finish attending to another flow for another mobile station. In the preferred embodiment, there will typically be a turnaround interframe space time period 414 between the acknowledgement and the response frame. As soon as possible, the access point will acquire the WLAN channel and transmit the response frame or frames. However, the response frame is not sent with regard to any predetermined schedule. That is, mobile station stays active to receive the response window for an indeterminate period of time. Of course, a reasonable maximum period of time could be observed to prevent the mobile station waiting too long for a response frame or remaining active too long. In the event the maximum period occurs, the mobile station can take appropriate action, such as polling the access point a second time during the service period to check the status of the power save buffers and retrieve any frames waiting to be transmitted. The response frame will identify the reserved traffic stream when it contains reserved data. If the access point has data in the reserved buffer associated with the reserved traffic stream, the access point will transmit a frame of data from the buffer. If there is no data in the aggregate buffer, the access point will transmit a null frame. Alternatively, if the aggregate buffer is empty, then the acknowledgement 410 may indicate such. In the response frame there will be signaling information, such as an EUSP bit designated to indicate the end of the present service period, which may occur because there is no more data to transmit or because a maximum service period time has been reached. In the preferred embodiment a MORE_DATA bit may be used as the EUSP bit. If the MORE_DATA bit is cleared in the response frame, it indicates the end of the UPSD service period due to successful transmission of all buffered frame for the mobile station in the aggregate buffer, or the end of the service period due to time considerations. If the access point transmits a null frame in the response frame, access point may also use the MORE_DATA bit to indicate there is no more data and to signal that the present service period is over. If the reserved buffer has only one frame of data buffered, it will transmit that frame of data, and likewise set the MORE_DATA bit to indicate there is no more data if the aggregate buffer is empty, otherwise the unreserved data in the aggregate buffer will also be transmitted to the mobile station. In response to receiving the response frame, in the preferred embodiment, the mobile station transmits an acknowledgement 420 within a short interframe space time period 418. If the response frame indicated the end of the present service period, the mobile station then places the WLAN subsystem into a low power state after receiving the response frame at time 422.

Figure 5:
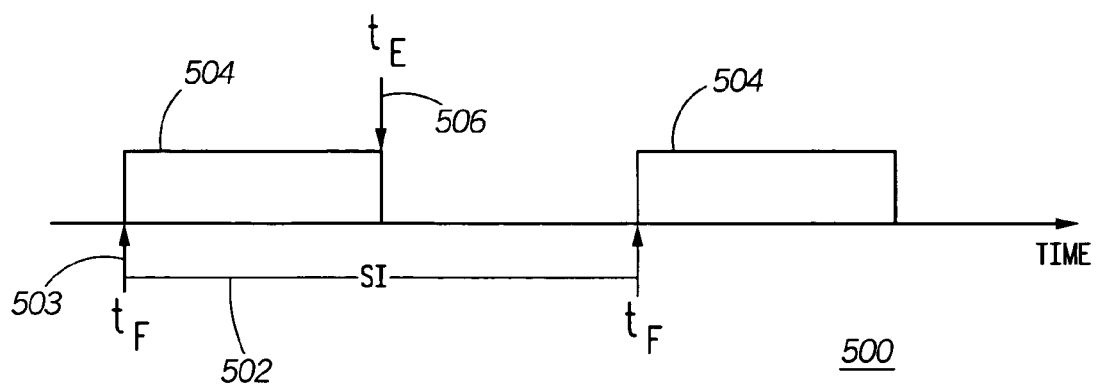
FIG. 5 shows a service interval and polling timer diagram for use with the invention.

Referring now to FIG. 5, there is shown a service interval and polling timer diagram 500 for use with the invention. Since the mobile station places the WLAN subsystem in a low power state, the WLAN subsystem cannot receive signals from the access point. Therefore to ensure the real time quality necessary for certain media streams, such as voice and video, the mobile station must maintain scheduling. Scheduling is done according to a service interval 502, which is a time period equal to the real time duration of a frame of data in the traffic stream under consideration. In the preferred embodiment, for real time voice applications requiring telephony quality, the service interval is about 20 milliseconds, but may vary with application and other parameters such as vocoder rate. That is, one frame of data contains about 20 milliseconds of voice data, with a new frame being produced every 20 milliseconds.

The controller of the mobile station powers up the WLAN subsystem at the beginning of a service interval 503. At the same time a window timer is initiated to time a polling window time period 504. If, upon powering up the WLAN subsystem, there is data associated with the present reserved traffic stream to be transmitted, the WLAN subsystem will immediately begin contending for the WLAN channel to transmit a polling frame that includes the data. However, if there is no data presently available upon powering up the WLAN subsystem, the WLAN subsystem waits as the window timer proceeds. If before expiration of the window time period (506), the voice processor delivers a data frame to the WLAN subsystem that is associated with the reserved traffic stream, the WLAN subsystem immediately begins contending for the WLAN channel to transmit the data in a polling frame. If, however, at the expiration of the window time period at 506 no data has arrived, the WLAN subsystem contends for the WLAN channel and transmits a null frame as the polling frame. It will be appreciated that the window timer will have a duration that is significantly shorter than the service interval time period.

To assure priority of admitted or reserved traffic, the contention scheme used by mobile stations is modified based on the priority of data being sent. Typically contention in WLAN systems is performed by determining if the WLAN channel medium is idle or busy. If the medium is idle, then there is presently no traffic on the channel. If the medium is busy, a station is presently transmitting. There are a variety of ways a station may determine whether the medium is idle or busy, such as, for example, channel carrier sensing, or energy sensing. For carrier sensing the WLAN device tunes its receiver to the channel carrier frequency and "listens" for a carrier. The presence of a carrier indicates the channel is presently in use. Similarly, if the energy in the channel exceeds a preselected threshold, then the medium is considered to be in use by another station. When the channel is in busy, the WLAN device waits for a pseudo-random time period within a range of time, and tries again. This is referred to as "back off." At the end of the back off time period, the WLAN device again senses the channel carrier frequency until the WLAN device finds the channel to be carrier free for a brief, preselected time period. Upon finding the channel to be available the WLAN device may commence transmitting data.

Various schemes exist where, as the WLAN device repeatedly finds the channel occupied, it reduces the range of time to back off and wait. In the preferred embodiment, where priority is given to real time applications, the back off time period range used in contention is initially shorter than that used in non-reserved data traffic stream contention. By using shorter back off periods for reserved traffic streams, these streams will generally acquire the channel before non-priority traffic.

In the UPSD power save mode of the invention after the mobile station transmits the polling frame, the mobile station stays awake until the access point transmits a response frame. The response frame is not transmitted according to any particular schedule. Instead the access point finishes whatever other transactions it is presently engaged in, if any, and then transmits the response frame or frames to the mobile station. The access point services the mobile station as soon as possible after receiving the polling frame, but not as a scheduled response, or at a predetermined time interval. One benefit of this unscheduled power save mode of operation is that the mobile station does not have to transmit a frame to indicate to the access point that the mobile station is transitioning to low power mode—it is assumed due to the presence of a TSID. In prior art power save mode, such as LGCY5 and LGCY6, the mobile station would often have to make three transmissions to complete a transaction or service period with the access point before placing the WLAN subsystem back into the low power state. Using the present unscheduled power save mode of the invention, the mobile station transmits a polling frame, and preferably an acknowledge frame after receiving the response frame from the access point. In transmitting the polling frame the mobile station provides a TSID to indicate the use of the UPSD mode of operation. The access point will always respond to a polling frame when the TSID is used, and will treat the mobile station as being in low power mode during the time when the access point is not responding to the polling frame. Therefore the access point will not treat the mobile station as being in a fully active state unless the mobile station explicitly requests to exit the UPSD power save mode, either by transitioning to the active mode or exiting the UPSD mode entirely by modifying its resource reservation to disable UPSD or terminate a reserved traffic stream.

Figure 6:
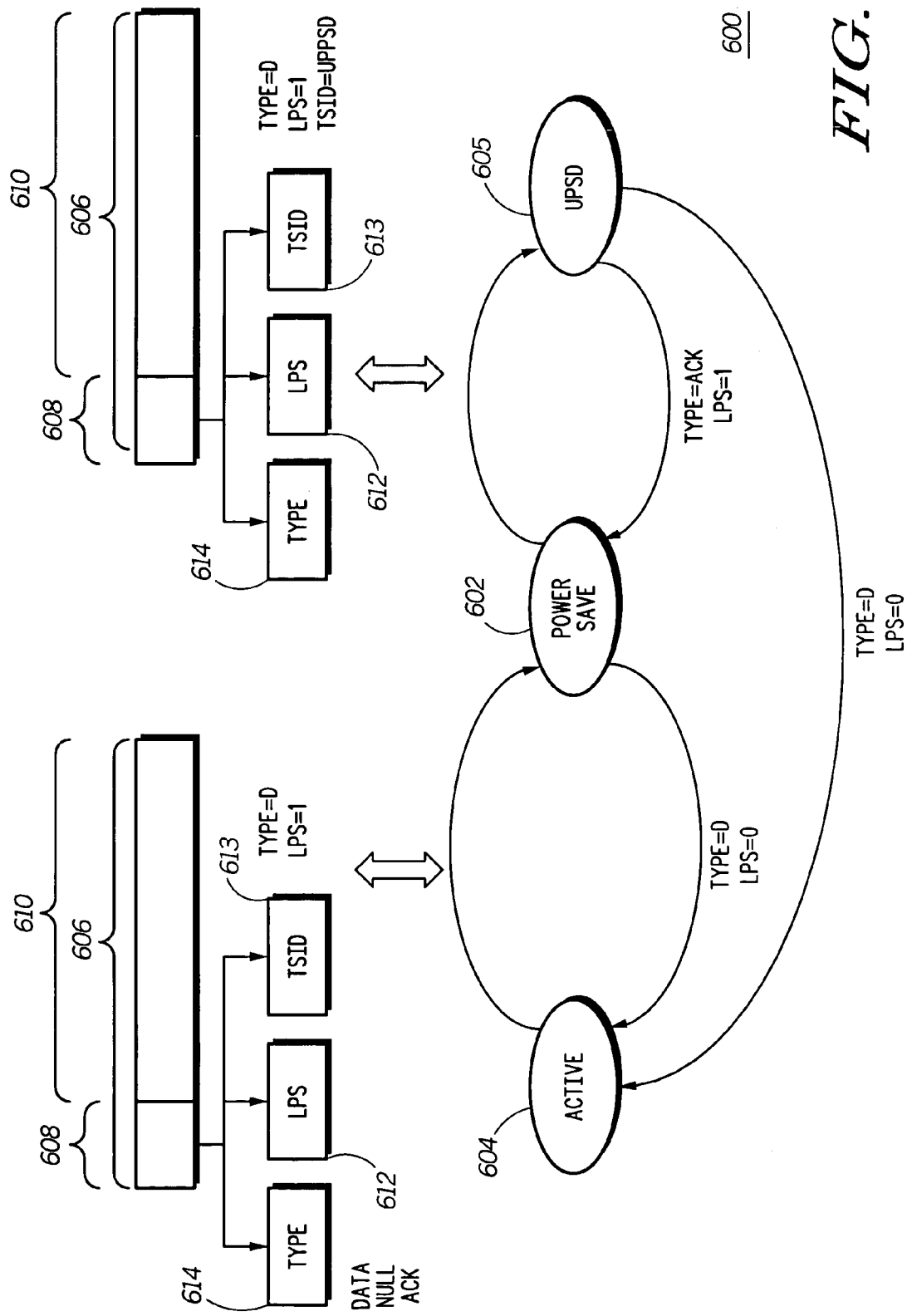
FIG. 6 shows a state transition diagram illustrating how a mobile station informs an access point as to the power save mode being used by the mobile station, in accordance with the invention.

Referring now to FIG. 6, there is shown a state transition diagram 600, illustrating how the mobile station informs the access point as to the power save mode being used by the mobile station. There are essentially three states; power save 602, active 604, and UPSD 605. From the active state, to transition to the sleep state, the mobile station transmits a frame 606 to the access point. The frame includes a header 608 and a payload 610 which may contain data or may be a null payload. Within the header are bits used to indicate power save state. According to the invention, there is a type bit 614 for indicating the type of frame the present frame is, such as a data frame, null frame of acknowledgement frame. The header may include a traffic specification identifier (TSID) 613 for identifying a particular reserved traffic stream o which the frame belongs. When the mobile station is transacting with the access point for a reserved traffic stream, the TSID will be used. In the preferred embodiment, the header also includes a legacy power save mode bit 612 to indicate the use of a legacy power save mode as an alternative to the present power save mode, such as those shown in FIGS. 4B and 4C. Setting either of these bits indicates to the access point that the mobile station is using the corresponding power save mode. Clearing the bits indicates the mobile station is in the active state. In a legacy power save mode, such as LGCY5 or LGCY6, the mobile station must transition from the power save state to the awake state each time it transacts with the access point. And when it is finished with a transaction for a given cycle, it must indicate to the access point that it is transitioning from the active state to the power save state. However, according to the invention, using the UPSD power save mode allows the mobile station to transact with the access point, without having to inform the mobile station of an explicit state change. As long as the TSID is present in the header, the state of the legacy power management bit is irrelevant for receiving TSID traffic from the access point.

Figure 7:
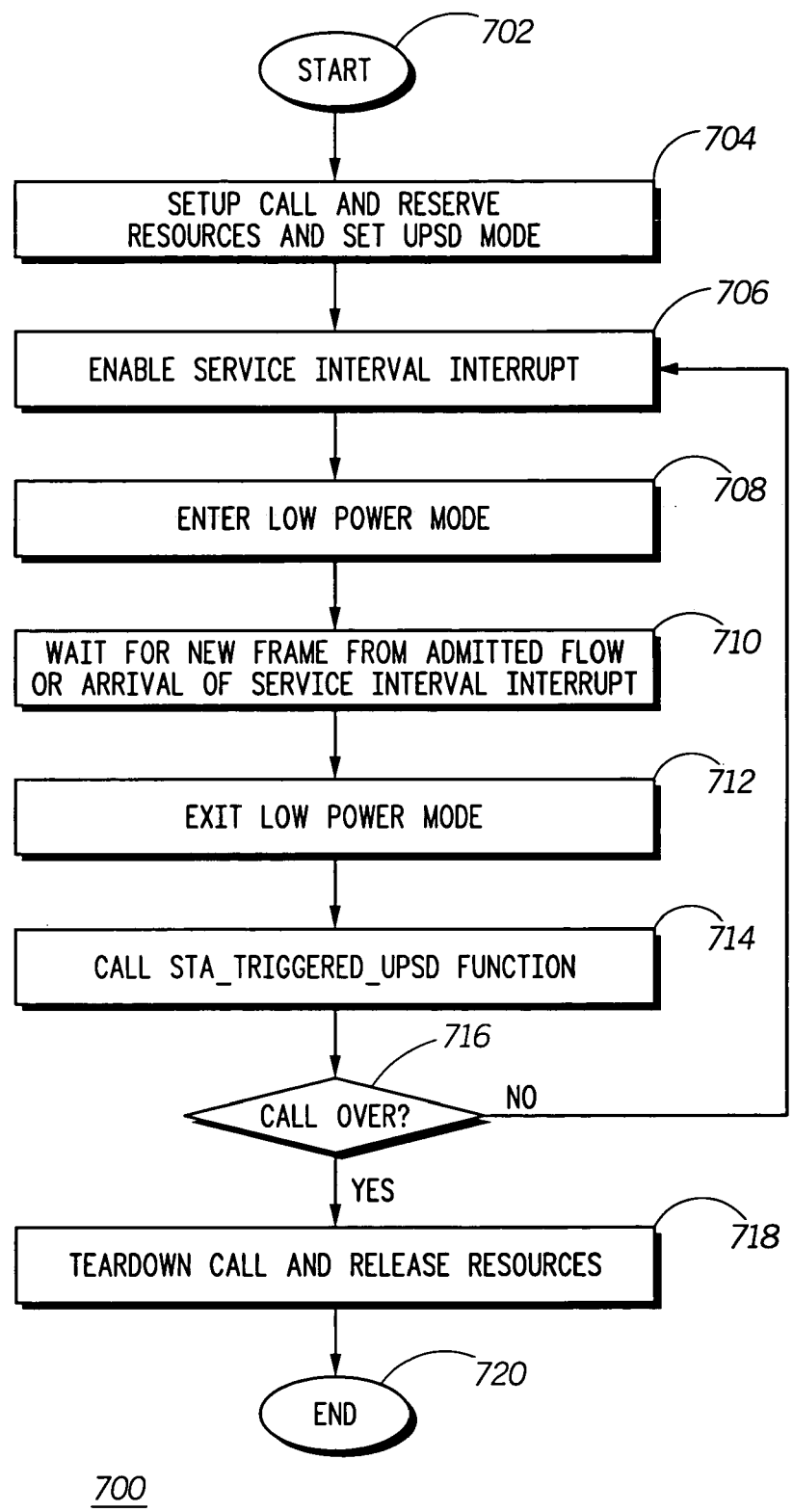
FIG. 7 shows a flow chart diagram illustrating a procedure used by a mobile station for using the unscheduled power save delivery mode, in accordance with the invention.

Referring now to FIG. 7, there is shown a flow chart diagram 700 illustrating a procedure used by a mobile station for using the unscheduled power save delivery mode, in accordance with the invention. At the start (702) of the method the mobile station and access point are powered up and ready to communicate. Next, a call needs to be set up (704). The call is essentially a data session with guaranteed resources so as to assure real time integrity of the information being carried during pendency of the data session. The call may be initiated by the mobile station or by the access point, as is known in the art. The mobile station and access point negotiate the quality of service to be used in association with the call, and during the negotiation the mobile station indicates the use of UPSD mode. In setting up the call, the access point admits the call traffic flow as a reserved traffic stream. Once the call is set up, the mobile station initiates a timing mechanism, such as the service interval interrupt and polling window timer (706), as described in reference to FIG. 5, herein. After admitting the reserved traffic stream and informing the access point that the mobile station will use the UPSD power save mode, the mobile station places the WLAN subsystem into a low power state (708). The low power state reduces power consumption by the WLAN subsystem, but also makes the transceiver inoperative. The use of low power modes is often referred to as putting the system in "sleep" mode. Sleep mode is accomplished by switching off power to certain components of the system.

Once the WLAN subsystem is in low power mode, the mobile station waits until either the arrival of a frame of data associated with the reserved traffic stream from the voice processor, or other real time media processor, or the occurrence of a service interval event, such as an interrupt (710). When new data associated with the reserved traffic stream arrives, or the service interval event occurs, the mobile station switches power back on to the WLAN subsystem (712). Next, the mobile station commences a frame exchange with the access point by initiating a frame exchange process (714) by, for example, calling a software subroutine to complete a service period. The frame exchange process is performed in accordance with the process described in reference to FIG. 4. Once the frame exchange is over, the mobile station checks to see if the call is over (716). If the call is continuing, then the process returns to setting the service interval interrupt (706). If the call is over, then the call is taken down and resources are released at the access point (718) which ends the process (720).

Figure 8:
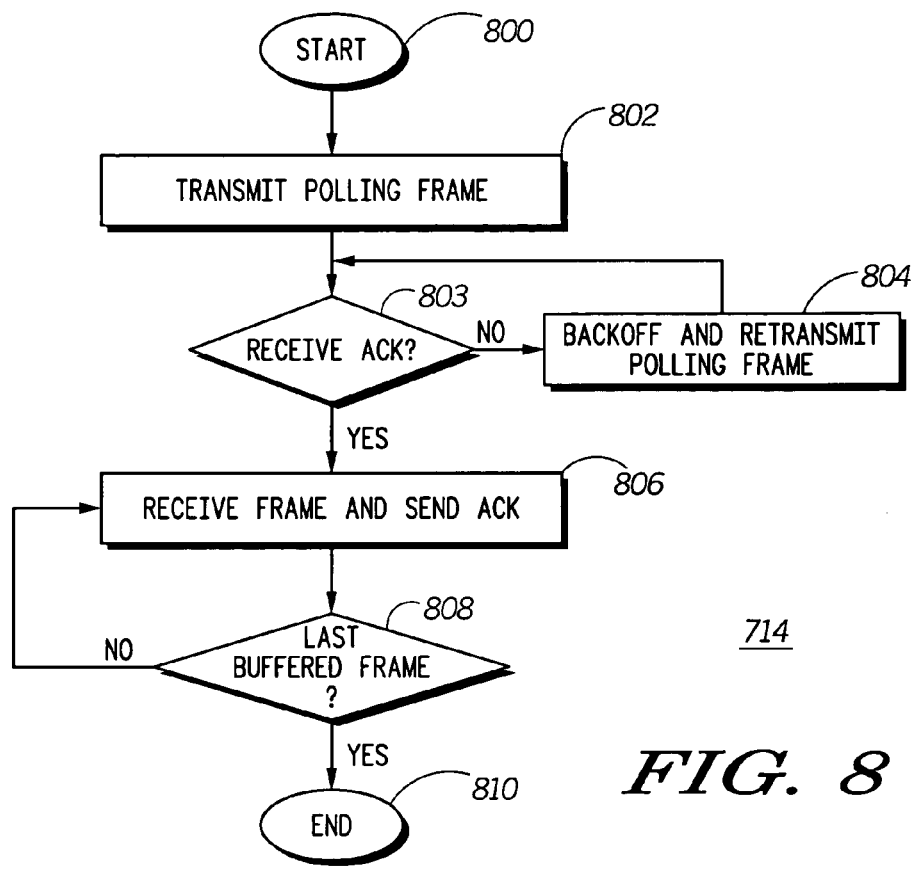
FIG. 8 shows a flow chart diagram of a mobile station frame exchange process, in accordance with the invention.

Referring now to FIG. 8, there is shown a flow chart diagram of a mobile station frame exchange process 714, in accordance with the invention. At the start 800 the mobile station checks to see if there is data presently pending for the reserved traffic stream from the voice or other real time media processors. If not, then the mobile station waits as the polling window timer times a polling window. The mobile station also contends for the WLAN channel during this time. Once the channel is acquired, the mobile station transmits a polling frame (802). The polling frame will contain data if data was pending or if data arrives during pendency of the window timer, otherwise the polling frame will be a null frame. The polling frame identifies the reserved traffic stream and UPSD mode. The reserved traffic stream is preferably identified by its TSID, and the presence of the traffic stream identifier indicates to the access point that the mobile station is using UPSD power save mode. In one embodiment of the invention, aggregate response from the access point is the default mode, but the aggregate response mode may also be selectable, and the desire to receive an aggregate response may be indicated in the polling frame.

In the preferred mode the access point transmits and acknowledgment which is received by the mobile station (803). If the acknowledgement is not received (804), the mobile station may back off by waiting, then retransmit the polling frame. After transmitting the polling frame, and, in the preferred mode, receiving the acknowledgment, the mobile station then waits for the access point to respond. Since the response is not scheduled, the time of the wait is variable, although the mobile station may have a preselected maximum time period to wait before undertaking an error procedure, assuming a failure of access point to respond. However, assuming normal operation, the access point will transmit an aggregation of response frames which will be received by the mobile station (806). In transmitting data from the aggregate buffer, data belonging to the traffic stream identified by the TSID used by the mobile station in the polling frame may be transmitted first, before unreserved data, in the aggregate response. Again, in the preferred mode, the mobile station will transmit an acknowledgement to assure the access point of a successful delivery. Upon receiving the response frame, the mobile station checks the EUSP bit to see if the UPSD service period is over. In the preferred embodiment, the MORE_DATA bit may be used to signal when more date is coming from the access point (808), and when it is set it indicates that the service period is continuing until at least one more response frame is received. If the MORE_DATA bit indicates subsequent frames are coming, then the mobile station remains active to receive them as it did for the first response frame. It is contemplated that subsequent response frames may contain data for a different reserved traffic stream also in use by the mobile station, or for the present reserved traffic stream. Once a response frame is received indicating no more data is coming from the access point, the process ends (810) and the mobile station places the WLAN subsystem in low power mode.

Figure 9:
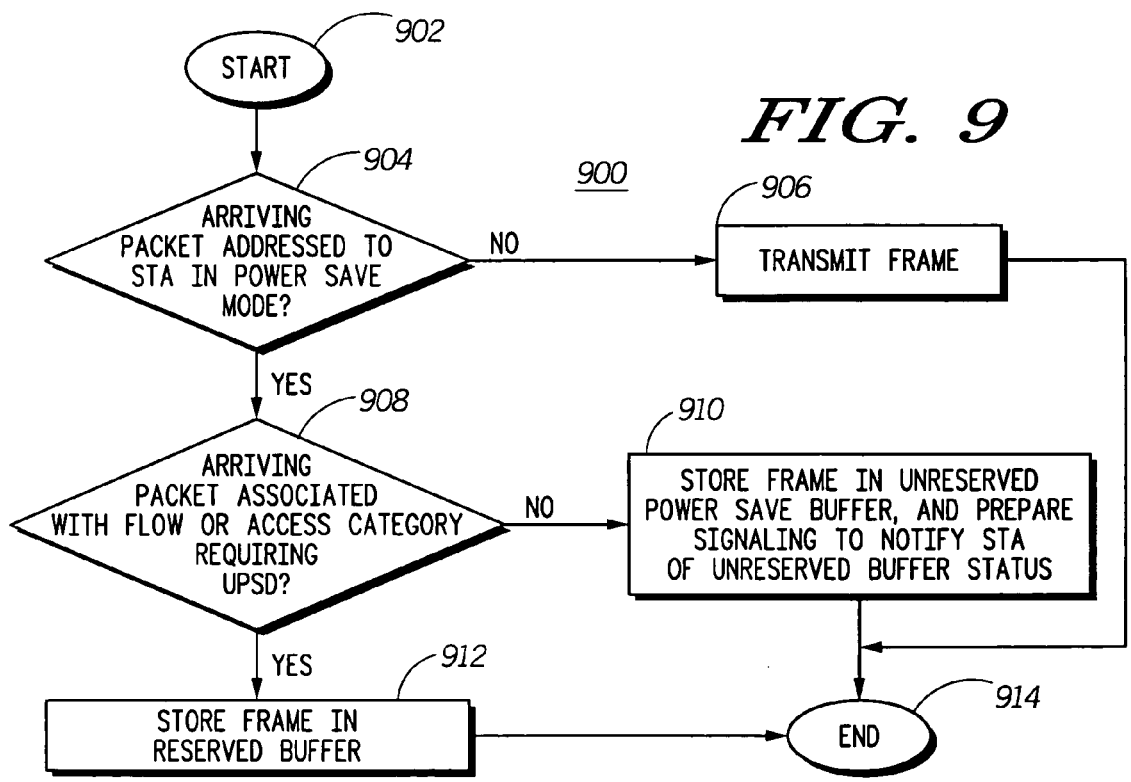
FIG. 9 shows a flow chart diagram of a method of buffering data at an access point, in accordance with the invention.

Referring now to FIG. 9, there is shown a flow chart diagram of a method of buffering data at an access point, in accordance with the invention. At the start (902) of the method, the access point has admitted a reserved traffic stream for establishing a call to a mobile station. Data packets arrive from a network at the access point that are designated for the mobile station. As data packets arrive, the access point checks to see if the data packet is destined for a mobile station that is presently in a power save mode (904). If the mobile station for which an arriving packet is destined is not presently in a power save mode, the access point transmits the packet (906) to the mobile station. If the mobile station is presently in a power save mode, then the access point must determine whether the mobile station is using a legacy power save mode or the present unscheduled power save delivery mode (908). If the mobile station is using a legacy power save mode, then the access point buffers the packet in a unreserved buffer (910) and will signal the mobile station as to the state of its buffer in, for example, a periodic beacon frame transmitted by the access point. If the packet is associated with an admitted flow for a mobile station using UPSD mode, then the packet is stored in a UPSD reserved buffer (912). In the preferred embodiment, the access point applies an aging policy to the UPSD buffer here only the two most recently received packets are retained in the buffer. If a new packet arrives and there are already two in the UPSD buffer, then the older buffered packet is discarded and the new packet is buffered.

Figure 10:
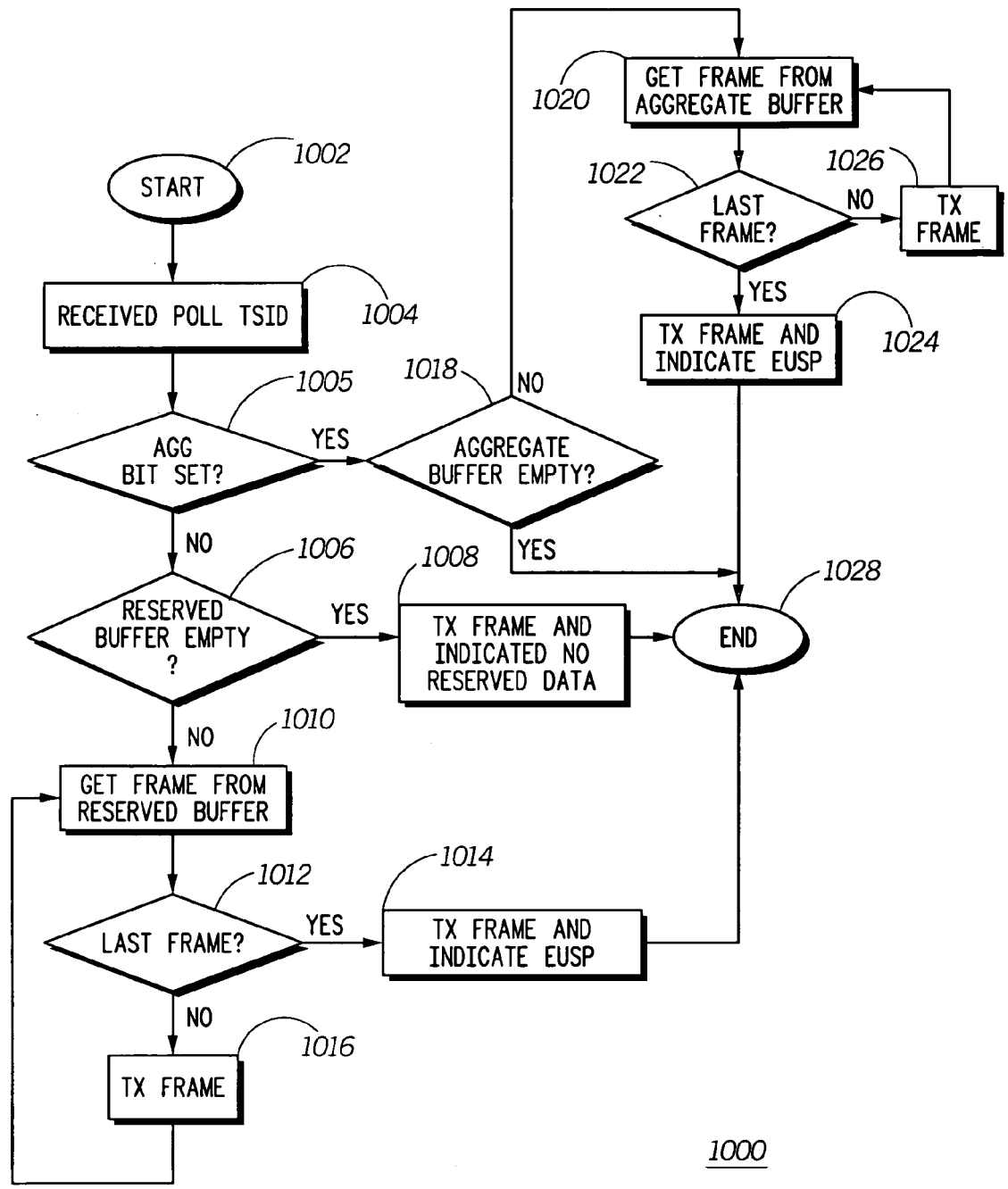
FIG. 10 shows a flow chart diagram of a method for unbuffering data at the access point for us in an unscheduled power save delivery mode, in accordance with the invention.

Referring now to FIG. 10, there is shown a flow chart diagram of a method for unbuffering data at the access point for us in an unscheduled power save delivery mode 1000, in accordance with the invention. At the start (1002) of the method, the access point has admitted a reserved traffic stream for establishing a call to a mobile station. The method proceeds when the access point receives a polling frame (1004) from the mobile station using UPSD mode. In one alternative embodiment of the invention, where aggregate response is selectable by the mobile station, and not the default response mode, the access point checks the aggregate response signaling bits (1005) in the polling frame to see if the mobile station has selected the aggregate response mode. If the aggregate response mode is selectable, and the mobile station has not selected the aggregate response mode, the access point, in response to the polling frame, checks the buffer associated with the reserved traffic stream indicated in the TSID field of the polling frame transmitted by the mobile station (1006). If there is no data in the UPSD buffer, then the access point acquires the WLAN channel and transmits a null frame (1008) indicating there is no more data. If there is data in the UPSD buffer, then the access point prepares the data for transmission. When there is only one frame of data remaining, the access point sets the EUSP bit, or alternatively clears the MORE_DATA bit to indicate there is no more data following the present response frame, acquires the WLAN channel, and transmits the response frame. If there is more data to be transmitted, EUSP bit is cleared, or alternatively the MORE_DATA bit is set to indicate such. Then the WLAN channel is acquired by the access point, and the aggregate response frame is transmitted to the mobile station (1016).

If the default mode is aggregate response delivery, or if the mobile station has selected aggregate response mode in the aggregate signaling bit of the pooling frame, then the access point checks to see if the aggregate buffer has data (1018). If the aggregate buffer is empty, meaning there is no reserved or unreserved data for the mobile station, then the service period ends 1028 by the access point either sending a null frame with the EUSP or MORE_DATA bit indicating there is no data, or the absence of data may be equivalently indicated in the acknowledgement frame in response to the polling frame. Assuming there is data in the aggregate buffer, the access point retrieves a frame of data (1020) and checks to see if the present frame of data will be the last frame (1022). If the present frame will not be the last frame, the frame is transmitted without indicate it as the last frame (1026). If the present frame in 1020, 1022 is the last frame to be transmitted during the present service period, then the access point indicates such in the frame and transmits the frame (1024).

Therefore the invention provides a method of performing power save operation in a wireless local area network (WLAN) by a mobile station while performing voice or other real time communications. The method begins by admitting a reserved traffic stream at the access point, which includes establishing a UPSD or reserved buffer at the access point for buffering data corresponding to the reserved traffic stream which is to be transmitted to the mobile station during the course of the call. The access point also ha a buffer for best-effort or unreserved data, and together the two buffers form an aggregate buffer. Once a call is established, the WLAN subsystem of the mobile station is placed into a low power state. Subsequently, the method commences by waking up the WLAN subsystem of the mobile station from the low power state to transmit data to the access point, if there is any data to transmit. Once the WLAN subsystem is powered up, the method commences by acquiring the WLAN channel between the mobile station and the access point, and transmitting a polling frame to the access point over the WLAN channel, the polling frame identifies the reserved traffic stream. Acquiring the WLAN channel is preferably performed through known contention protocol, including carrier sensing. The polling frame may be a null frame if no data has arrived at the WLAN subsystem of the mobile station, but otherwise contains data from the call. In response to transmitting the polling frame, the mobile station commences receiving an aggregate response at the mobile station over the WLAN channel. The aggregate response is transmitted by the access point and may include both reserved and unreserved data, and continues until the aggregate buffer is empty or until the end of a service period time interval. Once the aggregate response has been received, the mobile station commences setting the WLAN subsystem into the low power state. It should be noted that while the aggregate response is sent in response the polling frame, the aggregate response does not necessarily commence transmitting immediately. The access point may have other transactions that require servicing before the aggregate response may be transmitted, hence the aggregate response is transmitted in an unscheduled fashion. In the preferred mode the polling frame and response frame are both acknowledges by the respective receiver with an acknowledgment within a specified time, such as, for example, a short interframe space as specified by IEEE 802.11. Furthermore, the aggregate response may be selectable by indicating a desire to use the aggregate response mode in the pooling frame. Receiving the aggregate response may include receiving a header of a response frame having a EUSP bit clear, or alternatively a MORE_DATA bit set to indicate a second response frame will be transmitted subsequently, and wherein the method further includes receiving a second response frame at the mobile station. The mobile station may wake up in response to the presence of data received from a voice or other real time media process of the mobile station, or in response to a service interval interrupt. Upon the occurrence of a service interval event, at the beginning of a service interval, for example, the mobile station begins running window timer having a duration shorter than the service interval. If the window timer times out and there is still no data, then the mobile station commences transmitting a null frame. The service interval is selected as the real time duration represented by a frame of data.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of performing power save operation in a wireless local area network (WLAN) by a mobile station while performing voice communications, comprising:
   admitting a reserved traffic stream at an access point, including establishing a reserved buffer at the access point for buffering data corresponding to the reserved traffic stream to be transmitted to the mobile station;
   placing a WLAN subsystem of the mobile station in a low power state;
   waking up the WLAN subsystem of the mobile station from the low power state in response to the occurrence of a service interval timer event, the service interval timer for timing a service interval, the service interval defining a real time duration of a voice frame;
   transmitting a polling frame to the access point over a WLAN channel, the polling frame identifying the reserved traffic stream and including an aggregation indicator;
   in response to transmitting the polling frame, receiving an aggregate response at the mobile station over the WLAN channel, wherein the aggregate response includes at least one frame of data from an aggregate buffer of the access point, the aggregate buffer for buffering both unreserved and reserved data for the mobile station, and wherein receiving the aggregate response continues until the aggregate buffer is empty or a service time period expires; and
   upon receiving the aggregate response, setting the WLAN subsystem into the low power state.

2. A method of performing power save operation as defined by claim 1, wherein the aggregate response is transmitted in response to aggregate bit in the polling frame.

3. A method of performing power save operation as defined by claim 1, further comprising receiving an acknowledgement frame at the mobile station from the access point over the WLAN channel in response to transmitting the polling frame.

4. A method of performing power save operation as defined by claim 1, further comprising transmitting an acknowledgement frame from the mobile station to the access point over the WLAN channel in response to receiving the at least one response frame.

5. A method of performing power save operation as defined by claim 1, wherein:
receiving the aggregate response includes receiving a header of a first frame of the aggregate response having a MORE_DATA bit set to indicate a second response frame will be transmitted subsequently;
the method further comprising receiving a second response frame at the mobile station.

6. A method of performing power save operation as defined by claim 1, wherein transmitting the polling frame comprises transmitting a null frame.

7. A method of performing power save operation as defined by claim 6, wherein transmitting the null frame is performed upon expiration of a window timer initiated upon the beginning of a service interval, the service interval defining a real time duration of a voice frame, the window timer having a duration less than the service interval.

8. A method of performing power save operation as defined by claim 1, further comprising acquiring the WLAN channel after waking up the WLAN subsystem, performed by contending for the WLAN channel.

9. A method of performing power save operation as defined by claim 8, wherein contending for the WLAN channel is performed by carrier sensing.

10. A method of facilitating power save operation by an access point in a wireless local area network (WLAN) while performing voice communications, comprising:
admitting a reserved traffic stream at the access point, including establishing a reserved buffer at the access point for buffering data corresponding to the reserved traffic stream to be transmitted to a mobile station, the reserved buffer and unreserved buffer forming an aggregate buffer at the access point wherein unreserved data is buffered in the unreserved buffer;
placing a WLAN subsystem of the mobile station in a low power state;
waking up the WLAN subsystem of the mobile station from the low power state in response to the occurrence of a service interval timer event, the service interval timer for timing a service interval, the service interval defining a real time duration of a voice frame;
receiving a polling frame at the access point over a WLAN channel from the mobile station, the polling frame identifying the reserved traffic stream;
checking the aggregate buffer for buffered data to be sent to the mobile station; and
transmitting an aggregate response to the mobile station over the WLAN channel, the aggregate response being transmitted by the access point and including data in the aggregate buffer, the transmitting continuing until the aggregate buffer is empty or until a service time period is reached.

11. A method of facilitating power save operation as defined by claim 10, where transmitting the aggregate response is performed in response to the polling frame containing an aggregate bit indicating a desire to use an aggregate response mode.

12. A method of facilitating power save operation as defined by claim 10, further comprising transmitting an acknowledgement frame to the mobile station from the access point over the WLAN channel in response to receiving the polling frame.

13. A method of facilitating power save operation as defined by claim 10, further comprising receiving an acknowledgement frame from the mobile station at the access point over the WLAN channel in response to transmitting the aggregate response.

14. A method of facilitating power save operation as defined by claim 10, wherein:
transmitting the aggregate response includes transmitting a header of a first response frame having a MORE_DATA bit set to indicate a second response frame will be transmitted subsequently;
the method further comprising transmitting a second response frame to the mobile station.

15. A method of facilitating power save operation as defined by claim 10, wherein receiving the polling frame comprises receiving a null frame.

16. A method of facilitating power save operation as defined by claim 10, wherein transmitting the aggregate response comprises transmitting a null frame if there is no data in the aggregate buffer.

17. A method of facilitating power save operation as defined by claim 10, further comprising acquiring the WLAN channel in response to receiving the polling frame, performed by contending for the WLAN channel.

18. A method of facilitating power save operation as defined by claim 17, wherein contending for the WLAN channel is performed by carrier sensing.

19. A method of performing power save operation in a wireless local area network (WLAN) having at least one mobile station and at least one access point, the method comprising:
admitting a reserved traffic stream at the access point, including establishing a reserved buffer at the access point for buffering data corresponding to the reserved traffic stream to be transmitted to the mobile station, the reserved buffer and an unreserved buffer forming an aggregate buffer at the access point wherein unreserved data is buffered in the unreserved buffer;
placing a WLAN subsystem of the mobile station in a low power state;
waking up the WLAN subsystem of the mobile station from the low power state in response to the occurrence of a service interval timer event, the service interval timer for timing a service interval, the service interval defining a real time duration of a voice frame;
acquiring a WLAN channel between the mobile station and the access point, performed by the mobile station after waking up the WLAN subsystem from the low power state;
transmitting a polling frame over the WLAN channel from the mobile station upon acquiring the WLAN channel, the polling frame identifying the reserved traffic stream;
acquiring the WLAN channel, performed by the access point after checking the reserved buffer;
transmitting an aggregate response to the mobile station over the WLAN channel, the aggregate response being transmitted by the access point and including data in the aggregate buffer, the transmitting continuing until the aggregate buffer is empty or until a service time period is reached; and
upon receiving the aggregate response at the mobile station, setting the WLAN subsystem into the low power state.

20. A method of performing power save operation as defined by claim 19, further comprising transmitting an acknowledgement frame to the mobile station from the access point over the WLAN channel in response to transmitting the polling frame.

21. A method of performing power save operation as defined by claim 19, further comprising transmitting an acknowledgement frame from the mobile station to the access point over the WLAN channel in response to receiving the aggregate response.

22. A method of performing power save operation as defined by claim 19, wherein transmitting the polling frame comprises transmitting a null frame.

23. A method of performing power save operation as defined by claim 22, wherein transmitting the null frame is performed upon expiration of a window timer initiated upon the beginning of the service interval, the window timer having a duration less than the service interval.

24. A method of performing power save operation as defined by claim 19, wherein transmitting the polling frame comprises transmitting a frame of voice data, the voice data provided to the WLAN subsystem by a voice processing subsystem of the mobile station.

* * * * *